US012069176B2

(12) United States Patent
Leyva et al.

(10) Patent No.: US 12,069,176 B2
(45) Date of Patent: Aug. 20, 2024

(54) TOKEN MANAGEMENT SYSTEM AND METHOD

(71) Applicant: Visa International Service Association, San Francisco, CA (US)

(72) Inventors: Raul Leyva, Round Rock, TX (US); Pinesh Roy, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/783,610

(22) PCT Filed: Dec. 11, 2020

(86) PCT No.: PCT/US2020/064616
§ 371 (c)(1),
(2) Date: Jun. 8, 2022

(87) PCT Pub. No.: WO2021/119495
PCT Pub. Date: Jun. 17, 2021

(65) Prior Publication Data
US 2022/0376914 A1 Nov. 24, 2022

(51) Int. Cl.
*H04L 29/06* (2006.01)
*H04L 9/30* (2006.01)
*H04L 9/32* (2006.01)

(52) U.S. Cl.
CPC .......... *H04L 9/3213* (2013.01); *H04L 9/3073* (2013.01)

(58) Field of Classification Search
None
See application file for complete search history.

(56) References Cited

U.S. PATENT DOCUMENTS

| 9,105,027 | B2 | 8/2015 | Hammad et al. |
| 10,062,079 | B2 | 8/2018 | Kumnick et al. |
| 10,361,856 | B2 * | 7/2019 | Cassin ............... G06Q 20/3674 |
| 10,496,986 | B2 | 12/2019 | Narayan et al. |

(Continued)

FOREIGN PATENT DOCUMENTS

| AU | 2016203811 A1 | 6/2016 |
| AU | 2020256366 B2 | 6/2022 |

(Continued)

OTHER PUBLICATIONS

PCT/US2020/064616, "International Search Report and Written Opinion", Mar. 15, 2021, 13 pages.

(Continued)

*Primary Examiner* — Jeffery L Williams
(74) *Attorney, Agent, or Firm* — Kilpatrick Townsend & Stockton LLP

(57) ABSTRACT

A method is disclosed. The method includes transmitting, to a token service computer, a request message comprising a token requestor identifier associated with the token requestor and a service provider computer identifier associated with the service provider computer. The method also includes receiving a response message comprising the token and/or a cryptogram, generating an authorization request message comprising the token and the cryptogram, and transmitting the authorization request message to a processing computer in communication with a token service computer.

20 Claims, 9 Drawing Sheets

(56) References Cited

U.S. PATENT DOCUMENTS

| | | | |
|---|---|---|---|
| 10,817,875 | B2 | 10/2020 | Makhotin et al. |
| 11,093,936 | B2 | 8/2021 | Dill et al. |
| 11,329,822 | B2* | 5/2022 | Cassin ............... G06Q 20/3674 |
| 2017/0272253 | A1 | 9/2017 | Lavender et al. |
| 2017/0357964 | A1 | 12/2017 | Subrahmanyam et al. |
| 2017/0373852 | A1 | 12/2017 | Cassin et al. |
| 2018/0006821 | A1 | 1/2018 | Kinagi |
| 2018/0018666 | A1 | 1/2018 | Solanki et al. |
| 2018/0268405 | A1 | 9/2018 | Lopez |
| 2019/0288844 | A1* | 9/2019 | Cassin ............... G06Q 20/3672 |
| 2019/0385185 | A1 | 12/2019 | Narayan et al. |
| 2021/0344672 | A1* | 11/2021 | Drechsler ........... H04L 63/0838 |
| 2022/0231851 | A1* | 7/2022 | Cassin .................. H04L 63/062 |
| 2022/0376914 | A1* | 11/2022 | Leyva .................. H04L 9/3073 |
| 2023/0216679 | A1* | 7/2023 | Tomar .................. H04L 9/3236 713/168 |

FOREIGN PATENT DOCUMENTS

| | | | |
|---|---|---|---|
| CN | 105580038 | A | 5/2016 |
| CN | 109328445 | A | 2/2019 |
| EP | 3910908 | A1 | 12/2016 |

OTHER PUBLICATIONS

EP20900540.4 , "Extended European Search Report", Dec. 21, 2022, 15 pages.
CN202080085543.1 , "Office Action", Jul. 25, 2023, 8 pages.
EP20900540.4 , "Office Action", Apr. 12, 2024, 5 pages.

\* cited by examiner

TOKEN MANAGEMENT SYSTEM AND METHOD

CROSS-REFERENCES TO RELATED APPLICATIONS

This application is the U.S. National Phase of PCT Application No. PCT/US2020/064616, filed Dec. 11, 2020, which claims priority to U.S. Provisional Application No. 62/947,712, filed on Dec. 13, 2019, which are herein incorporated by reference in their entirety.

BACKGROUND

Token requestors can use tokens to process transactions instead of using real credentials. In some cases, however, many token requestors may coordinate with a single service provider to conduct transactions. The token requestors often need to register with a token service computer to process their tokenized transactions.

Current systems have problems to be addressed. For example, it is burdensome and difficult for each token requestor register with a token service provider. If a token requestor wants to be affiliated with a service provider computer, then each token requestor needs to register with both the service provider computer and the token service computer. If, for example, there are one hundred token requestors, then two separate registration processes need to be performed by each token requestor resulting in two hundred total registration steps performed by the one hundred token requestors.

Another problem is that multiple token requestors connecting to a token service computer via service provider computers have to use different encryption key pairs. The encryption keys that are shared between the token requestors and the token service computer are used to protect communications, and authenticate the token requestors to the token service computer. If encrypted communications are also desired between the token requestors and the service provider computer, then a different set of encryption keys needs to be used to protect communications between the service provider computer and the token requestors.

Another problem to be addressed is that the token service computer often validates token requestors before providing tokens and/or transaction cryptograms to the token requestors. If the token service computer independently evaluates each token requestor, it may not be able to accurately assess whether or not the token requestor is trustworthy. It would be desirable if additional data could be provided to assess the trustworthiness of the token requestors before issuing tokens or cryptograms to them.

Embodiments of the invention address these and other problems individually.

BRIEF SUMMARY

One embodiment of the invention is directed to a method comprising: receiving, by a service provider computer, a transaction initiation message from a token requestor computer; transmitting, by the service provider computer to a token service computer, a request message comprising a token requestor identifier associated with the token requestor, and a service provider computer identifier associated with the service provider computer; responsive to transmitting the cryptogram request message, receiving, by the service provider computer, a response message comprising a token and/or a cryptogram; generating, by the service provider computer, an authorization request message comprising the token and the cryptogram; transmitting, by the service provider computer, the authorization request message to a processing computer in communication with a token service computer, wherein the processing computer, in conjunction with the token service computer, determines a real credential associated with the token and validates the cryptogram; and responsive to transmitting the authorization request message, receiving, by the service provider computer, an authorization response message from the processing computer.

Another embodiment of the invention is directed to a service provider computer comprising: a processor; and a non-transitory computer readable medium, comprising instructions, that when executed by the processor, cause the processor to receive a transaction initiation message from a token requestor computer; transmit, to a token service computer, a request message comprising a token requestor identifier associated with the token requestor, and a service provider computer identifier associated with the service provider computer; responsive to transmitting the cryptogram request message, receive a response message comprising a token and/or a cryptogram; generating, by the service provider computer, an authorization request message comprising the token and the cryptogram; transmit the authorization request message to a processing computer in communication with a token service computer, wherein the processing computer, in conjunction with the token service computer, determines a real credential associated with the token and validates the cryptogram; and responsive to transmitting the authorization request message, receive an authorization response message from the processing computer.

Another embodiment of the invention includes a method comprising: transmitting, by a service provider computer to a token service computer, a token request message comprising a service provider identifier associated with the service provider computer, and a token requestor identifier associated with a token requestor of a plurality of token requestors operatively coupled to the service provider system; in response to transmitting the token request message, receiving, by the service provider computer from the token provider system, a token; and transmitting, by the service provider computer to the token requestor, the token.

These and other embodiments of the invention are described in further detail below.

DETAILED DESCRIPTION

Figure 1:
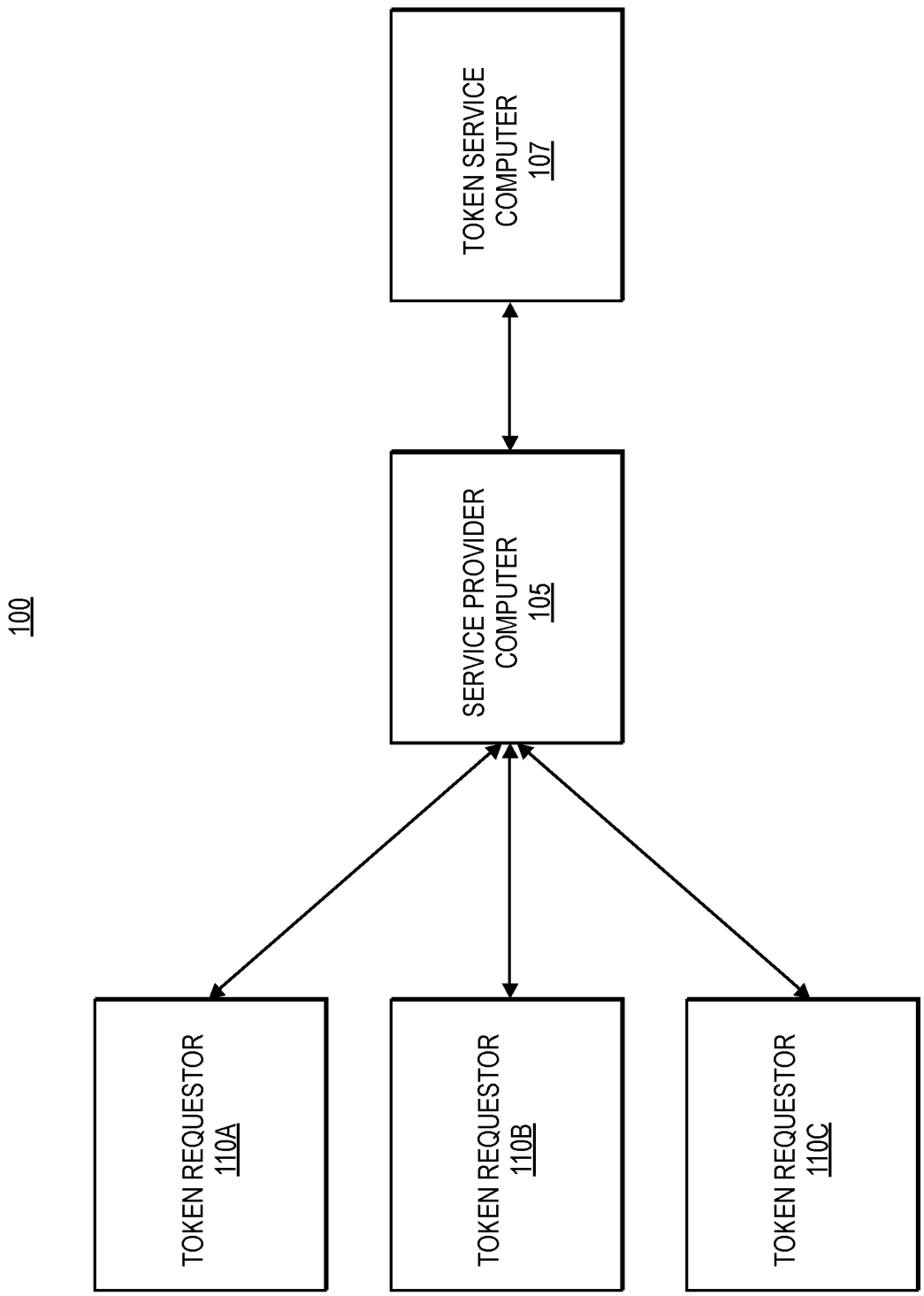
FIG. 1 shows a diagram of a system including token requestors, a service provider computer, and a token service computer.

Embodiments of the invention include systems and methods for providing, by a token service computer, unique token requestor identifiers (TRIDs) to a plurality of token requestor computers operated by token requestors. The token requestors are associated with a service provider computer. The token requestor computers may request tokens from the token service computer via the service provider computer. The token requestor computers may also provide those tokens to the service provider computer to process transactions using the tokens.

The service provider computer may use the token service computer to generate and store tokens. The token service computer may also provision a token assigned to a token requestor to a service provider computer in communication with the token requestor. The token service computer may also store the token, a real credential associated with the token, a token requestor identifier (TRID), and a service provider identifier together in a token requestor record in a database. The database may store many such records for many different token requestors. The service provider computer may subsequently use the token service computer to process transactions with the issued tokens.

In some embodiments, a service provider computer (e.g., a digital wallet computer, a social network computer, a transaction aggregator computer, etc.) may provide transaction services to a plurality of token requestors, each of which are assigned one or more tokens. In some embodiments, a token requestor may be a merchant, and the merchant may use tokens from multiple users (e.g., customers) of that merchant.

One or more unique identifiers may be assigned to each token requestor. For example, a token requestor may be assigned a token requestor identifier (TRID) and a service provider identifier. The token requestor identifier may identify the token requestor, while the service provider identifier may identify the service provider computer.

The token requestor identifier and the service provider identifier may be sent in existing and altered messages such as ISO 8583 type messages. For example, an eleven digit token requestor identifier (TRID) may be stored in the existing tag of a 0100 TAR/WS API message as <F123 DSID 68.03: XXXXXXXXXXX>, where the X values are a stand in for a unique value assigned as a TRID. A tag may also be added to an existing 0100 TAR/WS API message for a service provider identifier such as a TR-TSP (token requestor-token service provider) identifier as <F123 DSID 68.XX: (TR-TSP) Identifier>. These tags may also be present in notification messages such as 0600/0620 notification messages.

Additionally, the token service computer may provide the service provider computer with a single encryption key, which may be used to encrypt all messages passing between the service provider computer and the token service computer, regardless of the token requestor computers that are associated with the messages. Messages passing between the service provider computer and the token requestor computers can be secured by other cryptographic key pairs specifically assigned for each token requestor computer-service provider computer relationship.

Registration of a token requestor computer may require the token requestor computer to share certain data elements with the token service computer. For example, a token requestor computer may need to provide an external client ID (e.g., an ID provided by the service provider computer associated with the token requestor computer that identifies the token requestor to the token service computer), a token requestor identifier (TRID) (e.g., a token requestor ID assigned by the token service computer, if available), a name (e.g., a trade name, legal name, etc.) associated with the token requestor, application URL(s) (e.g., the application website URL(s) of the token requestor computer), a country code (e.g., an ISO country code) of a country where the token requestor operates, a DUNs ID (e.g., an ID assigned by Dun and Bradstreet), an acquirer assigned merchant ID (e.g., an ID assigned by the acquirer associated with a merchant to identify the merchant to the acquirer), and/or a governmental ID (e.g., a tax ID).

Embodiments of the invention have a number of advantages. For example, in embodiments of the invention, each token requestor can use a token requestor identifier and a service provider identifier to request tokens or cryptograms from a token service computer. As a result, the token service computer can better assess whether it should or should not provide the requested tokens and/or cryptograms to the token requestors. For example, the token service computer can evaluate a token requestor identifier to determine if it has any records which might indicate that the token requestor is potentially fraudulent. The token service computer may also evaluate the service provider identifier and may determine that the service provider identifier is associated with a trusted entity. For example, the service provider may be a digital wallet that has high security standards, and the token requestor's affiliation with the trusted service provider may be further evidence that the token request is not fraudulent and is a trusted entity.

Embodiments of the invention also allow for the simplification of authentication and data encryption key management for all token requestor computer-service provider computer combinations in the system. Additionally, embodiments of the invention provide increased transparency, as token requestor identifiers such as TRIDs and service provider identifiers such as TR-TSP identifiers may be provided to authorizing entities during provisioning and authorization processing. Embodiments of the invention also remove the need for the token service computer to provide encryption keys to each new token requestor. Instead, the token service computer only needs to provide an encryption key to the service provider. Any security updates can be easily handled by the service provider computer as it has pre-existing connections (e.g., APIs) and relationships with its token requestor.

Prior to discussing the details of some embodiments of the present invention, description of some terms may be useful in understanding the various embodiments.

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user. In some cases, a mobile device may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

"Authentication data" may include any data suitable for authenticating an entity such as user or mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a service. Examples of a service provider includes merchants, digital wallets, payment processors, social networks, etc.

A "user" may include an individual or a computational device. In some embodiments, a user may be associated with one or more personal accounts and/or mobile devices. In some embodiments, the user may be a cardholder, account holder, or consumer.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "authorization request message" may be a message that can be used to request authorization for something. In some embodiments, an authorization request message can be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some cases, an authorization response message is generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a web server.

A "processor" may include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "token service computer" may be any computer, group of computers, or network of computers used to generate, manage, and provide tokens.

A "token requestor" may be any entity that requires a token from a token service computer. Entities that are token requestors may include merchants, marketplaces, acquirers, payment service providers, digital wallets, etc.

A "token requestor identifier" such as a TRID may be any type of indicator used to uniquely identify a token requestor.

A "service provider identifier" can be an identifier for a service provider operating a service provider computer. In some embodiments, the service provider identifier may be referred to as a TR-TSP identifier.

An "interaction channel" is a channel through which two or more parties may interact. An interaction channel may be a payment channel through which a transaction is securely completed, such as a card-present channel, an eCommerce channel, a telephone channel, etc.

FIG. 1 illustrates an example system 100 including a service provider computer 105 and the token requestors 110A-110C in communication with the service provider computer 105. Each token requestor 110A-110C may be or operate a token requestor computer. Here, the service provider computer 105 can be a token requestor—token service provider (TR-TSP), and the token requestors 110A-C can be resource providers (e.g., merchants) using the TR-TSP as a service provider. Each token requestor 110A-C can be provided with a unique token requestor identifier (TRID) that may be used to identify the token requestor 110A-C during a transaction. This TRID may be given to the token requestors 110A-C by the service provider computer 105 or the token service computer 107. An example TRID value may start with a value that can be used to identify it as a TRID, and then may be followed by any number of values that form an identifier unique to the token requestor 110A-C. For example, a TRID value may begin with the digits "400" to identify it as a TRID, and those digits may be followed by eight additional digits as a unique identifier.

The service provider computer 105 may register the token requestors 110A-110C with the token service computer 107 through an API provided by the token service computer 107. In the registration process, the token service computer 107 may define the roles and responsibilities of the service provider computer 105, and the token requestors 110A-110C. The service provider computer 105 may also obtain specific details about each token requestor 110A-110C. For example, a token requestor computer may need to provide an external client ID (e.g., an ID provided by the service provider computer associated with the token requestor computer that identifies the token requestor to the token service computer), a token requestor identifier (TRID) (e.g., a token requestor ID assigned by the token service computer, if available), a name (e.g., a trade name, legal name, etc.) associated with the token requestor, application URL(s) (e.g., the application website URL(s) of the token requestor computer), a country code (e.g., an ISO country code) of a country where the token requestor operates, a DUNs ID (e.g., an ID assigned by Dun and Bradstreet), an acquirer assigned merchant ID (e.g., an ID assigned by the acquirer associated with a merchant to identify the merchant to the acquirer), and/or a governmental ID (e.g., a tax ID).

Figure 2:
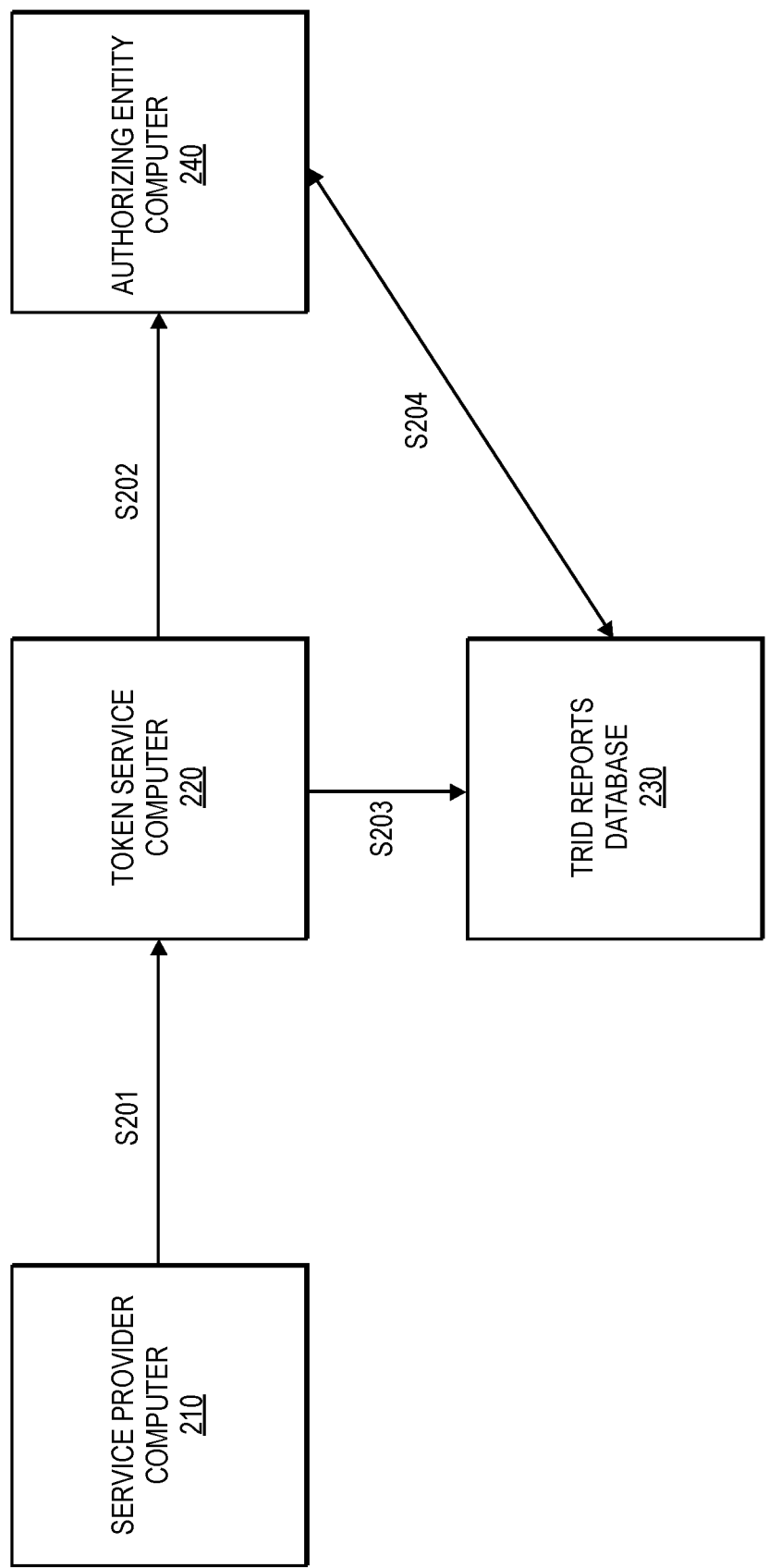
FIG. 2 shows a diagram of a system and process flow of a service provider computer using a token service computer to register tokens with an authorizing entity computer.

FIG. 2 shows a diagram of a system and a process flow illustrating a service provider computer 210 using a token service computer 220 to register a token requestor ID (TRID) with an authorizing entity computer 240. As described above with respect to FIG. 1, service provider computer 210 may be associated with a number of token requestors or token requestor computers that use unique TRIDs. TRID reports database 230 can be a database where the token service computer 220 may store TRID values and TRID report information. TRID reports database 230 may be accessible by both the token service computer 220 and the authorizing entity computer 240. The authorizing entity computer 240 may be an entity such as a bank.

A method may be described with respect to FIG. 2. In step S201, the service provider computer 210 can register a token requestor with token service computer 220 via a dedicated registration API. The registration process can assign a TRID to the token requestor associated with the service provider computer 210. In some embodiments, the token requestor may be a resource provider such as a merchant, and the service provider computer 210 may be a digital wallet computer or a social network computer.

In step S202, after receiving the request to register the token requestor, the token service computer 220 may send a TRID notification to the authorizing entity computer 240. In step S203, the token service computer 220 may also store the TRID value and any information associated with it in the TRID reports database 230. TRID reports database 230 may store information such as the TRID assigned to the token requestor, service provider identifier such as a TR-TSP identifier assigned to the service provider computer 230, the legal name of the token requestor, etc.

In step S204, the authorizing entity 240 may access any information in the TRID reports 230 database.

Figure 3:
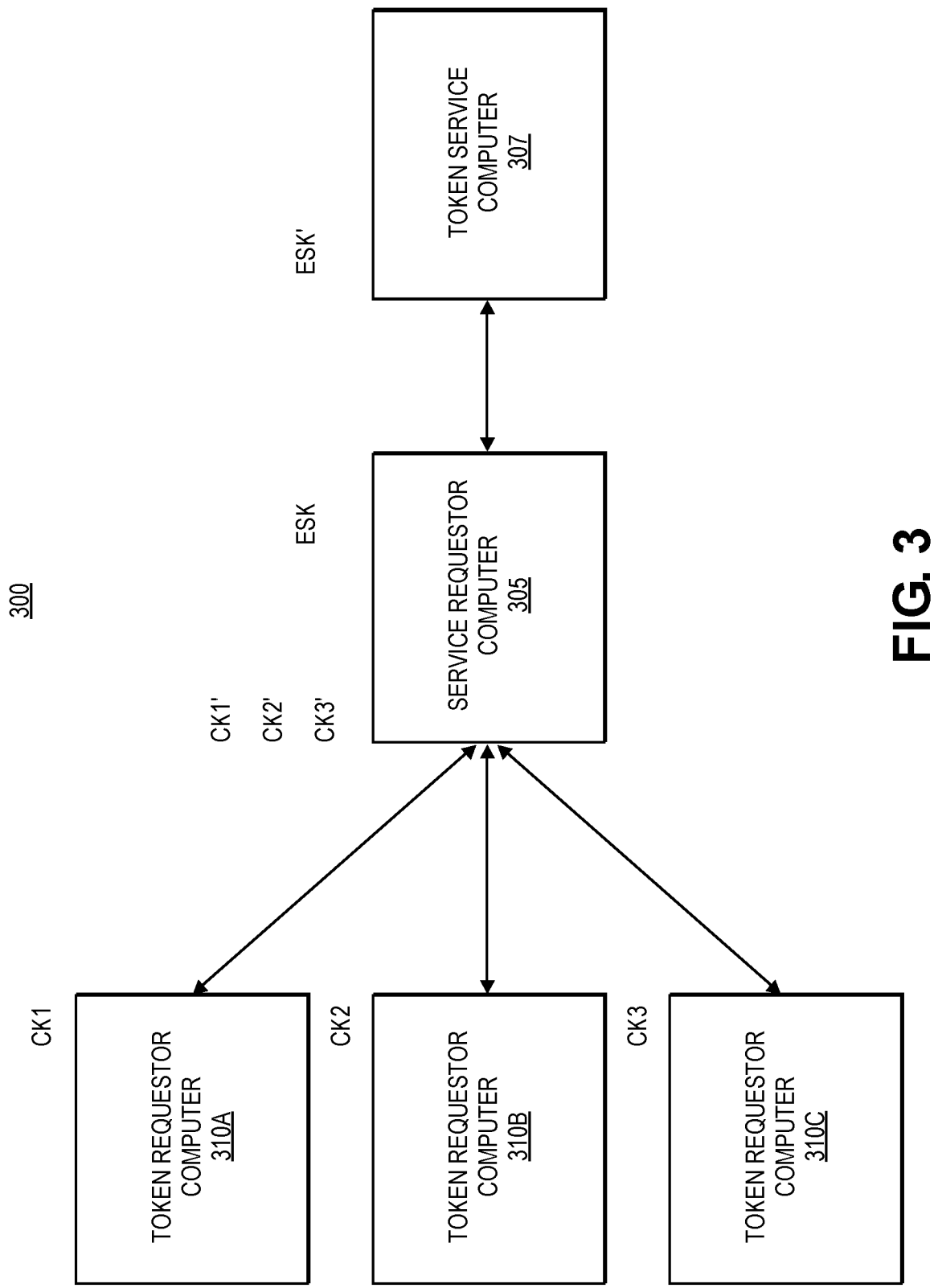
FIG. 3 shows a diagram of a system including token requestors, a service provider computer, and a token service computer. Encryption key pairs are illustrated.

FIG. 3 shows a system 300 with token requestor computers 310A-310C in communication with a service provider computer 305 and a token service computer 307. Each token requestor computer 310A-310C may request a token and/or a transaction cryptogram from the token service computer 330. Rather than generating a unique encryption key for each token requestor computer 310A-310C to encrypt messages sent to and received from the token service computer 330, the service provider computer 320 may form a trusted relationship with the token service computer 330. As a result of this trusted relationship, the token service computer 330 can issue a single encryption key to the service provider computer 320. The single encryption key may be referred to as an encryption super key (ESK), which may be used to encrypt all communications between the service provider computer 320 and the token service computer 330, irrespective of the token requestor computer 310A-310C involved with the communications. Communications between the token requestor computers 310A-310C and the service provider computer 305 may be encrypted using respective key pairs CK1-CK1', CK2-CK2', CK3-CK3'. The key pairs CK1-CK1', CK2-CK2', CK3-CK3' may be symmetric or asymmetric cryptographic key pairs.

Illustratively, a first token request computer 310A may request a token from the token service computer 307 via the service provider computer 305. The communication from the first token requestor computer 310A to the service provider computer 305 may be encrypted by the first token requestor computer 310A with key CK1 and may be decrypted by the service provider computer 305 using key CK1'. The communication from the service provider computer 305 to the token service computer 307 may be encrypted by the service provider computer 305 using key ESK and may be decrypted by the token service computer 307 using key ESK'. The token service computer 307 may then process the token request.

At some other time, a second token request computer 3106 may request a token from the token service computer 307 via the service provider computer 305. The communication from the second token requestor computer 3106 to the service provider computer 305 may be encrypted by the first token requestor computer 310A with key CK2 and may be decrypted by the service provider computer 305 using key CK2'. The communication from the service provider computer 305 to the token service computer 307 may be encrypted by the service provider computer 305 using key ESK and may be decrypted by the token service computer 307 using key ESK'. The token service computer 307 may then process the token request.

The token service computer 330 can create a map of service provider computer to token requestor relationships. A table may be created by mapping the association between a service provider identifier such as a TR-TSP identifier associated with the service provider computer 320 and the TRIDs of token requestors computers 310A-310C associated with the trusted TR-TSP identifier. The token service computer 330 may then generate a new encryption key that will be accepted as an encryption super key and grant access to communications provided by the service provider computer 320. The token service computer 330 may then allow requests to be authenticated with the encryption super key. The encryption super key may be of any suitable type of encryption key (e.g., AES256, RSA PKI 2048, Opacity A, ECC, etc.) and may allow for any authentication hash type (e.g., SHA256(x), HmAC(xv2), etc.).

It is noted that the encryption key scheme shown in and described with respect to FIG. 3 can be used to encrypt or decrypt the messages from analogous entities in any of the process flows in FIGS. 4-7, which are described below. For example, with respect to FIG. 6, the message in step S602 can be encrypted with a key such as CK1 and then decrypted with a key such as CK1. The decrypted message may then be encrypted in step S603 with a key ESK and then decrypted with the corresponding key ESK.

Figure 4:
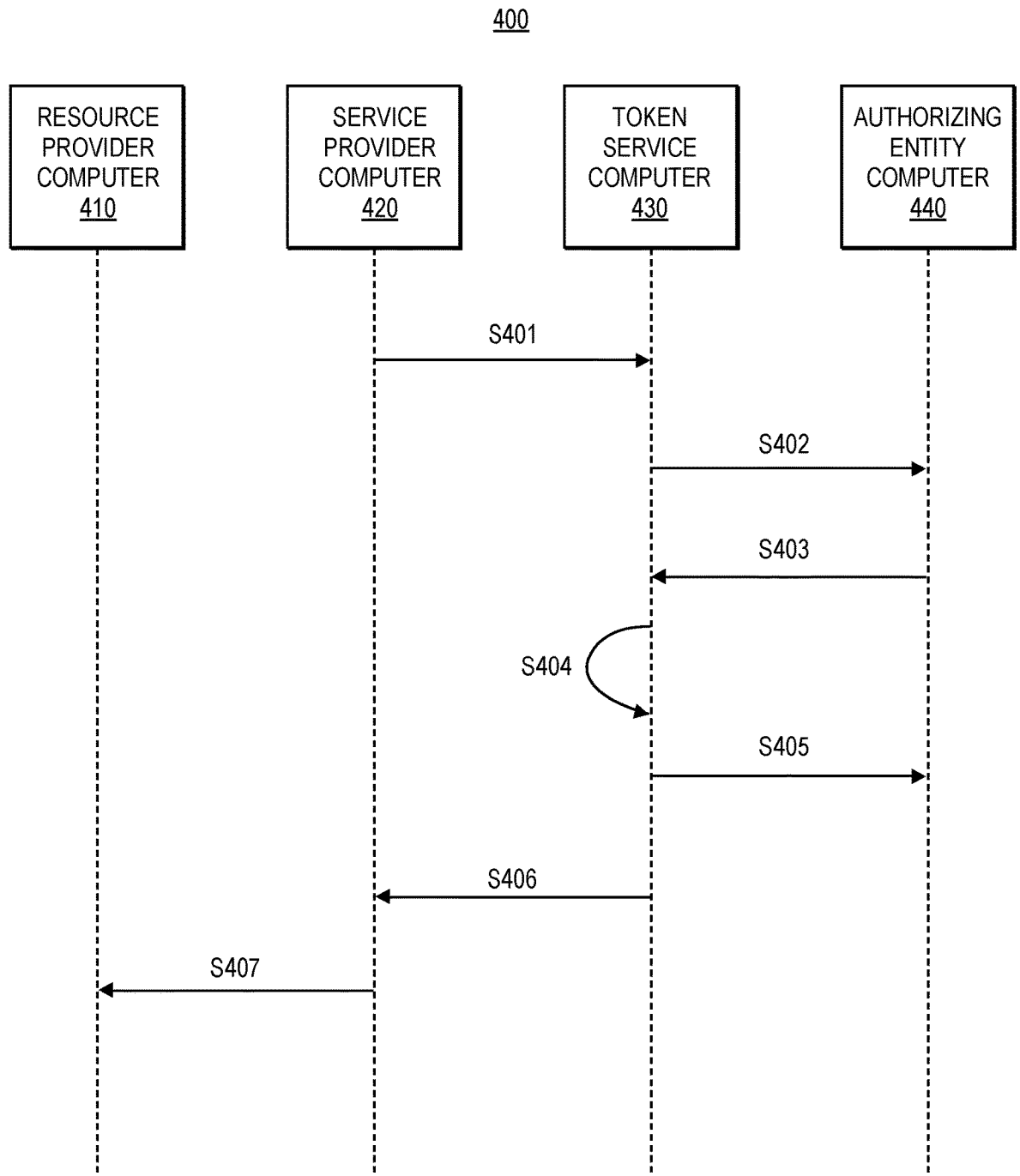
FIG. 4 shows a flow diagram illustrating a process flow for provisioning a resource provider computer with a token.

FIG. 4 shows an exemplary process flow 400 for provisioning a ecommerce (E-Com)/credential-on-file (COF) token to a resource provider associated with resource provider computer 410. Resource provider computer 410 may be a token requestor computer associated with a service provider computer 20 that communicates with a token service computer 430.

In step S401, the service provider computer 420 may transmit a token request message to the token service computer 430 for an eCommerce (E-Com)/credential-on-file (COF) token for the resource provider computer 410 (e.g., a merchant computer). The token request message may include a primary account number (PAN) or reference to a PAN, the service provider computer identifier (e.g., a TR-TSP identifier) associated with the service provider computer 420, and the TRID associated with the resource provider computer 410.

In step S402, token service computer 430 may validate the relationship between the service provider computer 420 and the resource provider computer 410. Then, upon validation, the token service computer 430 may send the token request message to the authorizing entity computer 440.

In step S403, the authorizing entity computer 440 may respond to the token request message by either approving or declining the request. The authorizing entity computer 440 may send a token response back to the token service computer 530.

In step S404, upon receiving a notice of approval from the authorizing entity 440, the token service computer 430 may generate an E-Com/COF token with the TRID associated with the resource provider computer 410 and continue to step S405. If token service computer 430 receives a notice of rejection from the authorizing entity 440, token service computer 430 may generate a rejected token response message and skip to step S406.

In step S405, token service computer 430 may send a notification of the token creation to the authorizing entity computer 440, the notification including appropriate token data. The token service computer 430 may then map the service provider computer identifier to the token requestor identifier and the issued token in a table.

In step S406, token service computer 430 may send a token response message containing either the E-Com/COF token or a notice of rejection to the service provider computer 420. In some embodiments, the service provider computer 420 may store the received token on behalf of the resource provider computer 410 for future transactions.

In step S407, the service provider computer 420 may forward the token response message received from token service computer 430 to the resource provider computer 410. The token response message received by the resource provider computer 410 may or may not contain the token.

Figure 5:
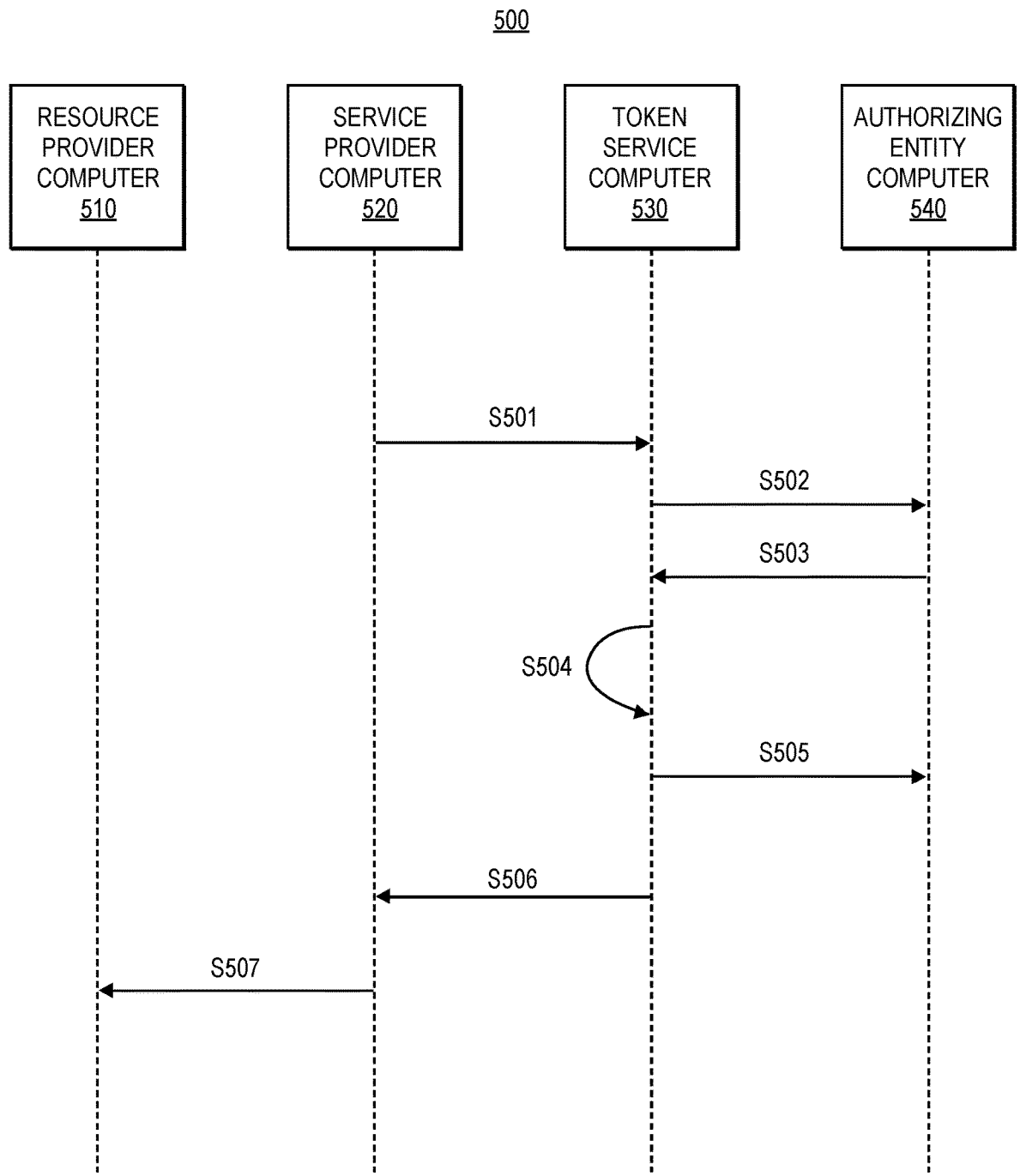
FIG. 5 shows a flow diagram for provisioning a token requestor with a token for user initiated transactions and resource provider initiated transactions.

FIG. 5 shows an exemplary process flow 500 for provisioning a token to a resource provider computer 510 that uses an existing device token. Resource provider computer 510 may be a token requestor associated with a service provider computer 520.

In step S501, the service provider computer 520 transmits a token request message to the token service computer 530 for a E-Com/COF token for a resource provider. The token request message may include at the least the token associated with the resource provider computer 510, the service provider computer identifier (e.g., a TR-TSP identifier) associated with service provider computer 520, and the TRID associated with the resource provider computer 510. Additionally, the token request message may also include a cryptogram associated with the resource provider computer 510.

In step S502, the token service computer 530 may, if the device cryptogram is present in the token request message, validate the cryptogram of the resource provider computer 510. Upon validation, token service computer 530 may send the token request message to the authorizing entity computer 540. The token request message may be sent in the form of a digital message (e.g., a 0100 TAR/AV message) to the authorizing entity computer 540. The message may contain at least the following information: the PAN, the PAN source, the TRID associated with the resource provider computer 510, and a service provider identifier associated with service provider computer 520.

In step S503, the authorizing entity computer 540 may respond to the token request message by either approving or declining the request, and may send the response back to the token service computer 530.

In step S504, upon receiving a notice of approval from the authorizing entity computer 540, the token service computer 530 may generate an E-Com/COF token for the TRID associated with the resource provider computer 510 and continue to step S505. If token service computer 530 receives a notice of rejection from the authorizing entity computer 540, token service computer 530 may generate a rejected token response message and skip to step S506.

In step S505, token service computer 530 may send a notification of the token creation to the authorizing entity computer 540, the notification including appropriate token data. The token service computer 530 may then map the service provider computer identifier with the token requestor identifier to a table.

In step S506, token service computer 530 may send a token response message containing either the E-Com/COF token or a notice of rejection to the service provider computer 520. The service provider computer 520 may store the token or may pass it on to the resource provider computer 510.

In step S507, the service provider computer 520 may forward the token response message received from token service computer 530 to the resource provider computer 510.

Figure 6:
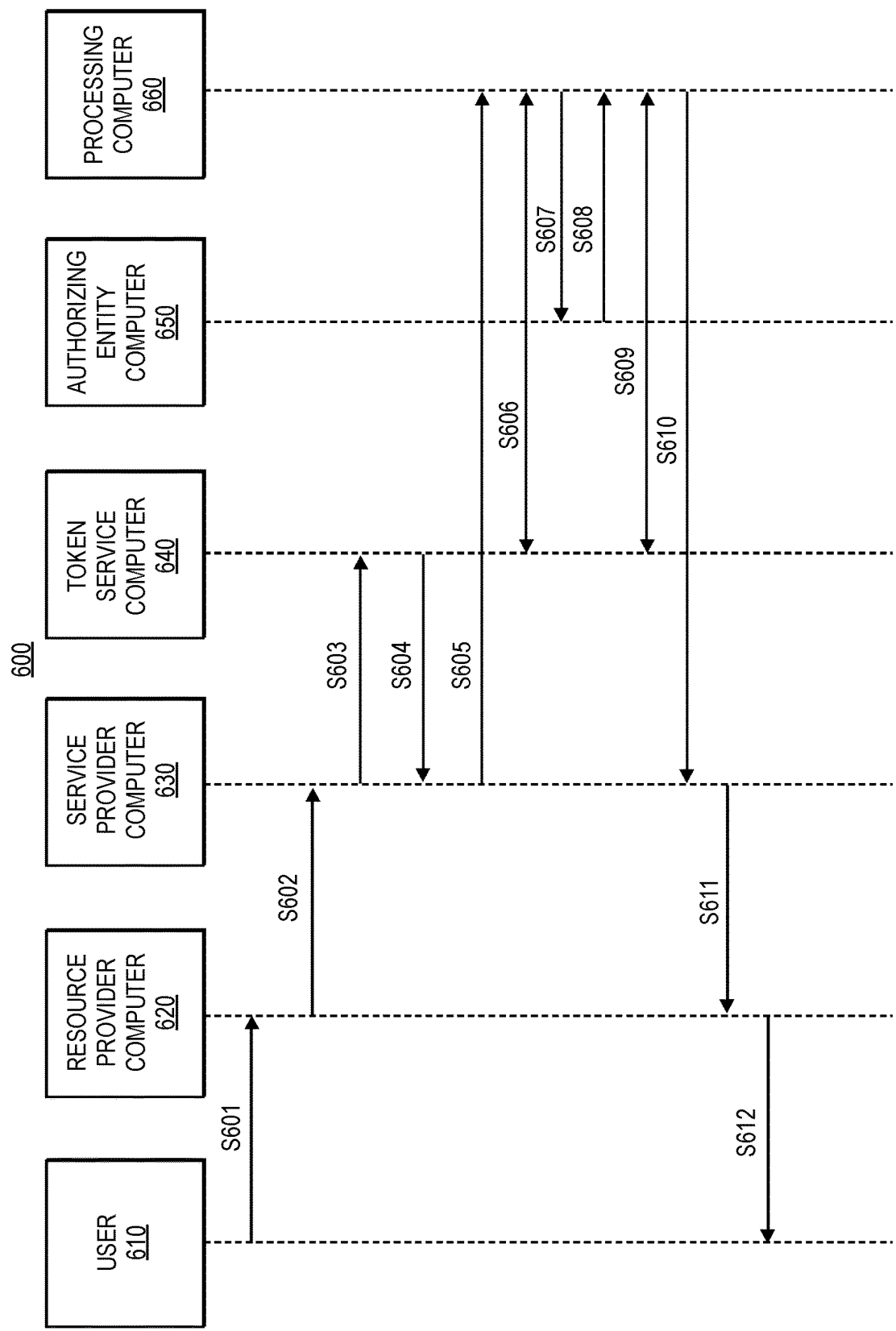
FIG. 6 shows a flow diagram for a user initiated transaction with a resource provider computer that has an existing token on file.

FIG. 6 shows an exemplary process flow 600 for executing a user-initiated-transaction payment with an existing stored token. User 610 may be any person or entity seeking to conduct a transaction with a resource provider associated with resource provider computer 620. Resource provider computer 620 may be a token requestor associated with a service provider computer 630 that communicates with a token service computer 640.

In step S601, a user 610 confirms their transaction and submits a checkout request to the resource provider computer 620 through their user device. The transaction may be an exchange between the user 610 and a resource provider 620.

In step S602, the resource provider computer 620 transmits a transaction initiation message to the service provider computer 630. The transaction initiation message may include the amount to be transferred during the transaction, a description of the good or service being exchanged, etc.

In step S603, the service provider computer 630 may transmit to a token service computer 640, a cryptogram request message comprising a token or token identifier, a resource provider identifier associated with the resource provider, and a service provider computer identifier associated with the service provider computer. The resource provider identifier can be a token requestor ID (TRID) and the service provider computer identifier can be a token requestor-token service provider (TR-TSP) identifier in some embodiments. In some cases, the cryptogram request message can include the token, such as a payment token. The token may be generated mathematically from the real credential (e.g., PAN). In other embodiments, the token is not provided, but a token identifier is provided. The token identifier may be used to retrieve a token which is stored by the service provider computer 630, and may be used to subsequently process the transaction.

In step S604, the token service computer 640 may generate a cryptogram (such as a TAVV cryptogram) and may return the token and cryptogram called in step S603 to the service provider computer 630. The cryptogram may be a channel-specific cryptogram, such that the cryptogram is valid for a single channel and cannot be used through other interaction channels. The token service computer 640 may validate that the token, or the token associated with the given token identifier, the resource provider identifier associated with the resource provider, and the service provider computer identifier are associated with each other before generating the cryptogram. The token service computer 640 may map the service provider computer identifier with the token requestor identifier to a table. The table storing the relationship between service provider (TR-TSP) and resource provider (TR), which may then be accessed to validate the relationship between them in further transactions.

In step S605, an authorization request message comprising the token and cryptogram is transmitted by the service provider computer 640 to a processing computer 660.

In step S606, the processing computer 660, in conjunction with the token service computer 640, determines a real credential associated with the token and validates the cryptogram to determine if the transaction is being conducted in the correct interaction channel.

In step S607, the processing computer 660 then will send an authorization response message to the authorizing entity computer 650.

In step S608, the authorizing entity computer 650 sends an authorization response message back to the processing computer 660.

In step S609, the processing computer 660 exchanges the real credential for the token.

In step S610, the processing computer 660 sends the authorization response back to service provider computer 630.

In step S611, service provider computer 630 may send the authorization response message back to the resource provider computer 620.

In step S612, a checkout completion message may be sent to the user 610 through the user's device.

At a later time, a clearing and settlement process can be performed between the authorizing entity computer 650, the processing computer 660, and the service provider computer 630 or another entity (e.g., an acquirer computer) associated with the resource provider computer 620 or the service provider computer 630.

Figure 7:
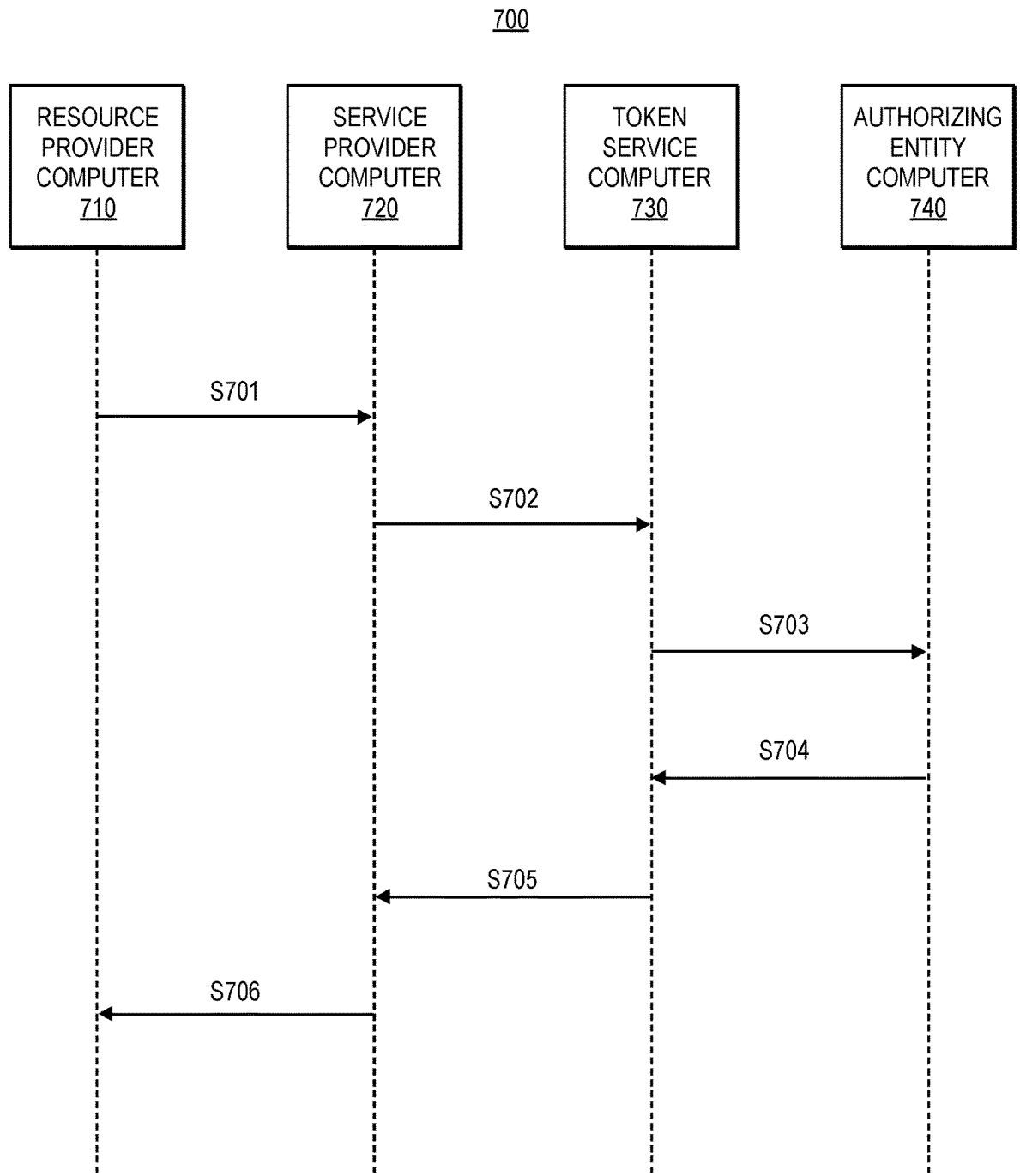
FIG. 7 shows a swim lane diagram showing a process flow for a resource provider initiated transaction.

FIG. 7 shows an exemplary process flow 700 for executing a resource provider initiated transaction. Resource provider computer 710 may be a token requestor associated with a service provider computer that is partnered with a token service computer 730. Transport computer 720 may be operated by an acquirer and may process transactions for token requestors. Authorizing entity computer 740 may be operated by an entity such as a bank.

In step S701, the resource provider computer 710 may transmit an authorization request message to the transport computer 720.

In step S702, the transport computer 720 may send the authorization request message to the token service computer 730. The authorization request message may include at the least the token associated with the resource provider computer 710, the service provider computer ID associated with a service provider computer registered with token service computer 730, and the resource provider identifier associated with the resource provider computer 710.

In step S703, token service computer 730 may detokenize the data sent in the authorization request message, perform domain controls, and populate any relevant tags in authorization request message that is sent to the authorizing entity computer 740 for approval.

In step S704, the authorizing entity computer 740 may either approve or reject the transaction, and may send an authorization response message back to token service computer 730.

In step S705, token service computer 730 may send the authorization response message to service provider computer 720.

In step S706, transport computer 720 may send the authorization response message to the resource provider computer 710.

At a later time, a clearing and settlement process can be performed between the authorizing entity computer 740, a processing computer, and the service provider computer 720 or another entity (e.g., an acquirer computer) associated with the resource provider computer 710 or the service provider computer 720.

Figure 8:
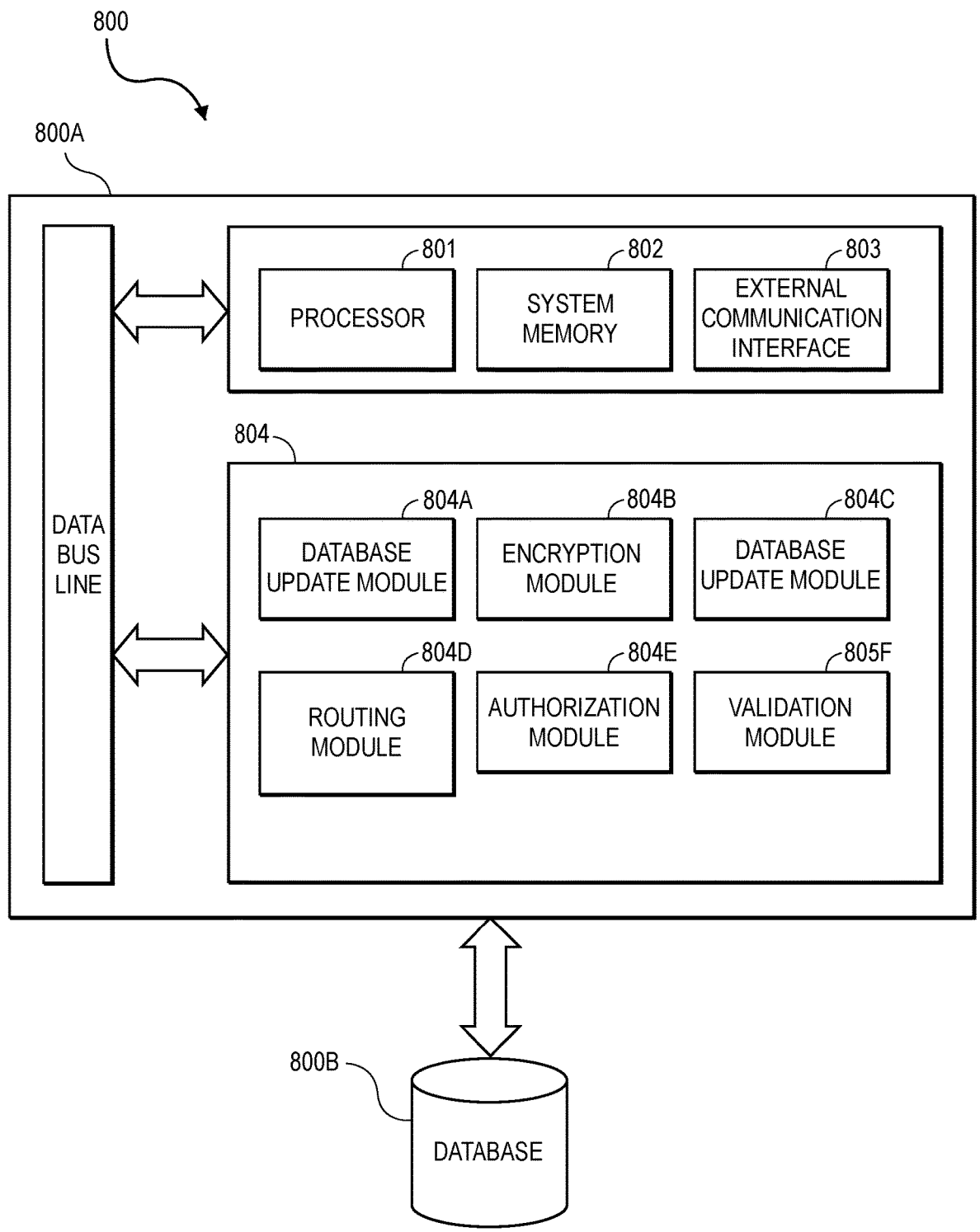
FIG. 8 shows a block diagram of a service provider computer according to an embodiment of the invention.

FIG. 8 shows a block diagram of a service provider computer 800 according to an embodiment of the invention. FIG. 8 shows a server computer 800A and a database 800B coupled to the server computer 800A.

The database 800B may store account information associated with each of the token requestors (e.g., resource providers) and token service computers that it is interacting with. It may also store the previously described cryptographic keys that are used to secure communications between the resource providers and the token service computers.

The database 800B (as well as any other database described herein) may be a conventional, fault tolerant, relational, scalable, secure database such as Oracle™ or Sybase™. The database 800B may be implemented using various standard data-structures, such as an array, hash, (linked) list, structured text file (e.g., XML), table, and/or the like. Such data-structures may be stored in memory and/or in (structured) files.

The server computer 800A may comprise a processor 801, which may be coupled to a system memory 802 and an external communication interface 803. A computer readable medium 804 may also be operatively coupled to the processor 801.

The computer readable medium 804 may comprise a number of software modules including a communication module 804A, an encryption module 804B, a database update module 804C, an authentication code generation module 804D, an authorization module 804E, and a validation module 804F.

The communication module 804A may comprise code that causes the processor 801 to generate messages, forward messages, reformat messages, and/or otherwise communicate with other entities.

The encryption module 804B may include any suitable encryption algorithms to encrypt data in embodiments of the invention. Suitable data encryption algorithms may include DES, triple DES, AES, etc. It may also store encryption keys that can be used with such encryption algorithms. The encryption module 804B may utilize symmetric or asymmetric encryption techniques to encrypt and/or verify data.

The database update module 804C may work in conjunction with the processor 801 to update account information in the database 800B.

The routing module 804D may comprise computer code, which when executed by the processor 801, causes the service provider computer 800 to properly route messages to their intended destinations.

The authorization module 804E may comprise code that can cause the processor 801 to perform authorization processing including generating and transmitting authorization request and response messages.

The validation module 804F may comprise code, which causes the processor 801 to validate any token requestors.

The computer readable medium 804 may comprise code, executable by the processor to implement a method comprising: receive a transaction initiation message from a resource provider computer; transmit, to a token service computer, a cryptogram request message comprising a token or token identifier, a resource provider identifier associated with the resource provider, and a service provider computer identifier associated with the service provider computer; responsive to transmitting the cryptogram request message, receive a cryptogram response message comprising the token and a cryptogram; generate an authorization request message comprising the token and the cryptogram; transmit the authorization request message to a processing computer in communication with a token service computer, wherein the processing computer, in conjunction with the token service computer, determines a real credential associated with the token and validates the cryptogram; and responsive to transmitting the authorization request message, receive an authorization response message from the processing computer.

Figure 9:
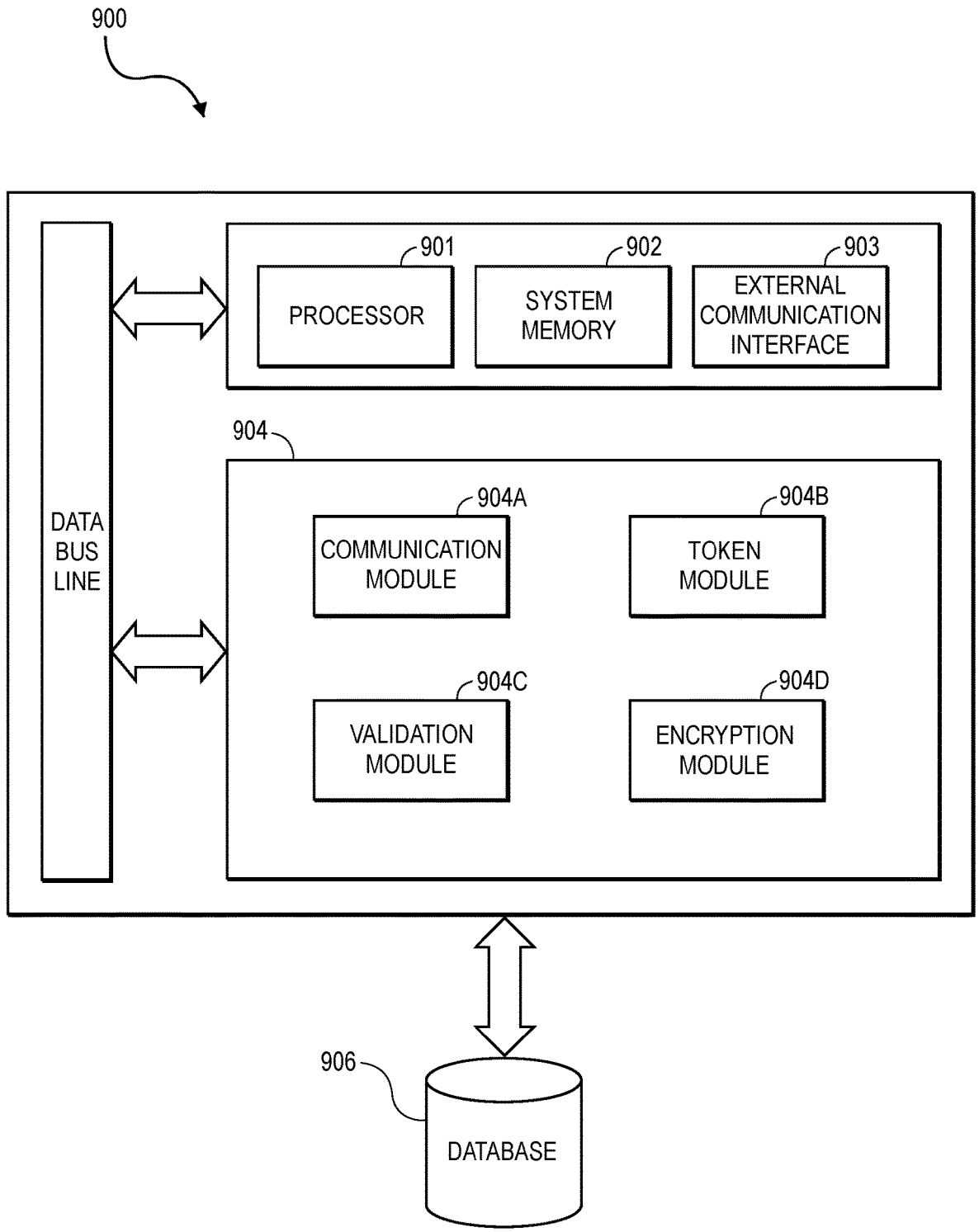
FIG. 9 shows a block diagram of a token service computer according to an embodiment of the invention.

FIG. 9 shows a block diagram of a token service computer 900 according to an embodiment. The token service computer 900 may also be in a payment processing network in some embodiments of the invention. The token service computer 900 may comprise a processor 901, which may be coupled to a system memory 902 and an external communication interface 903. A computer readable medium 904 may also be operatively coupled to the processor 901.

In some embodiments, the token service computer 900 may be part of a payment processing network that switches transaction request and responses between issuers and acquirers. A payment processing network may be a transaction processing network. A transaction processing network may process payment transactions or other types of access transactions.

The computer readable medium 904 may comprise a number of software modules including a communication module 904A, token module 904B, a validation module 904C, and an encryption module 904D.

The communication module 904A may comprise code that causes the processor 901 to generate messages, forward messages, reformat messages, and/or otherwise communicate with other entities.

The token module 904B may comprise code that causes the processor 901 obtain and/or manage tokens. It may include code for mathematically deriving tokens or obtaining them from memory or from external sources.

The validation module 904C may comprise code to perform risk analysis or to validate token requestors or service providers. For example, the validation module 904C, in conjunction with the processor 901, can evaluate data about a token requestor, a service provider, and a credential associated with a token to determine if the risk of providing the token to the token requestor is unacceptably high.

The encryption module 904D may comprise code that causes the processor 901 to perform encryption processing. Suitable data encryption algorithms may include DES, triple DES, AES, etc. It may also store encryption keys that can be used with such encryption algorithms.

The processor 901 may also be in communication with the database 906. The database 906 may include records which link a token requestor identifier, a token, a real credential, and a service provider identifier. The database 906 may also store tokens, cryptograms, cryptographic keys, etc.

Embodiments of the invention are not limited to the above-described embodiments. Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in entirety for all purposes. None is admitted to be prior art.

What is claimed is:

1. A method of using a token and a cryptogram in a transaction, the method comprising:
   receiving, by a service provider computer, a transaction initiation message from a token requestor computer, wherein the transaction initiation message is encrypted with a first cryptographic key of a first cryptographic key pair that is shared between the token requestor computer and the service provider computer;
   decrypting, by the service provider computer, the transaction initiation message with a corresponding first cryptographic key of the first cryptographic key pair;
   encrypting and then transmitting, by the service provider computer to a token service computer, a request message comprising a token requestor identifier associated with the token requestor computer, and a service provider computer identifier associated with the service provider computer, wherein the request message is encrypted with a second cryptographic key of a second cryptographic key pair shared between the service provider computer and the token service computer, wherein the token service computer subsequently decrypts the request message using a corresponding second cryptographic key of the second cryptographic key pair;
   responsive to transmitting the request message, receiving, by the service provider computer, a response message comprising the token and/or the cryptogram;

generating, by the service provider computer, an authorization request message comprising the token and the cryptogram;

transmitting, by the service provider computer, the authorization request message to a processing computer in communication with the token service computer, wherein the processing computer, in conjunction with the token service computer, determines a real credential associated with the token and validates the cryptogram; and responsive to transmitting the authorization request message, receiving, by the service provider computer, an authorization response message from the processing computer.

2. The method of claim 1, wherein the cryptogram is a channel-specific cryptogram that is only valid in a particular interaction channel.

3. The method of claim 1, wherein the request message is a cryptogram request message further comprising the token or a token identifier, and wherein the token service computer validates that the token, the token requestor identifier associated with the token requestor computer, and the service provider computer identifier are associated with the service provider computer before generating the cryptogram.

4. The method of claim 3, wherein the token service computer comprises a table mapping the service provider computer identifier with the token requestor identifier.

5. The method of claim 3, wherein transmitting, by the service provider computer to the token service computer, the cryptogram request message comprising the token or token identifier, the token requestor identifier associated with the token requestor computer, and the service provider computer identifier associated with the service provider computer comprises transmitting, by the service provider computer to the token service computer, the cryptogram request message comprising the token identifier, the token requestor identifier associated with the token requestor computer, and the service provider computer identifier associated with the service provider computer.

6. The method of claim 1, wherein the token requestor computer is a resource provider computer.

7. The method of claim 1, wherein the token is mathematically generated from the real credential.

8. The method of claim 1, wherein the token requestor computer received an interaction request from a user device associated with a user.

9. A service provider computer for processing a transaction using a token and a cryptogram, the service provider computer comprising:

a processor; and a non-transitory computer readable medium, comprising instructions, that when executed by the processor, cause the processor to receive a transaction initiation message from a token requestor computer, wherein the transaction initiation message is encrypted with a first cryptographic key of a first cryptographic key pair that is shared between the token requestor computer and the service provider computer;

decrypt the transaction initiation message with a corresponding first cryptographic key of the first cryptographic key pair;

encrypt and then transmit, to a token service computer, a request message comprising a token requestor identifier associated with the token requestor computer, and a service provider computer identifier associated with the service provider computer, wherein the request message is encrypted with a second cryptographic key of a second cryptographic key pair shared between the service provider computer and the token service computer, wherein the token service computer subsequently decrypts the request message using a corresponding second cryptographic key of the second cryptographic key pair, responsive to transmitting the request message, receive a response message comprising the token and/or the cryptogram;

generate an authorization request message comprising the token and the cryptogram;

transmit the authorization request message to a processing computer in communication with the token service computer, wherein the processing computer, in conjunction with the token service computer, determines a real credential associated with the token and validates the cryptogram; and responsive to transmitting the authorization request message, receive an authorization response message from the processing computer.

10. The service provider computer of claim 9, wherein the request message is a cryptogram request message and comprises the token.

11. The service provider computer of claim 9, wherein the token requestor identifier is a token requestor ID and the service provider computer identifier is a token requestor-token service provider ID.

12. The service provider computer of claim 9, wherein the cryptogram is formed from the token requestor identifier and the service provider computer identifier.

13. The service provider computer of claim 9, wherein the real credential is a PAN.

14. The method of claim 1, wherein the service provider computer is in in communication with a plurality of token requestor computers including the token requestor computer, wherein each token requestor computer in the plurality of token requestor computers separately shares a cryptographic key pair with the service provider computer to encrypt and decrypt transaction initiation messages, and wherein the second cryptographic key pair is used encrypt and decrypt request messages derived from the transaction initiation messages transmitted from the service provider computer to the token service computer.

15. The method of claim 1, further comprising:

prior to receiving the transaction initiation message, registering, by the service provider computer, the token requestor computer with the token service computer.

16. The method of claim 15, wherein registering occurs via a dedicated registration API.

17. The method of claim 1, further comprising:

prior to receiving the transaction initiation message, registering, by the service provider computer, a plurality of token requestor computers with the token service computer.

18. The method of claim 17, wherein registering occurs via a dedicated registration API.

19. The method of claim 1, wherein the first cryptographic key pair is a symmetric key pair and the second cryptographic key pair is a symmetric key pair.

20. The method of claim 1, wherein the token service computer validates a relationship between the service provider computer and the token requestor computer, transmits the request message to an authorizing entity computer, and receives an approval of the request message from the authorizing entity computer before transmitting the response message comprising the token and/or the cryptogram.

* * * * *